United States Patent [19]

Burdette, Jr. et al.

[11] Patent Number: 4,734,188

[45] Date of Patent: Mar. 29, 1988

[54] FILTER FOR HOT MELT ADHESIVE

[75] Inventors: David L. Burdette, Jr., Norcross; David J. Byerly, Lawrenceville, both of Ga.

[73] Assignee: Nordson Corporation, Amherst, Ohio

[21] Appl. No.: 919,025

[22] Filed: Oct. 15, 1986

[51] Int. Cl.⁴ .................... B01D 29/02; B01D 35/30
[52] U.S. Cl. .................... 210/107; 210/108; 210/323.2; 210/333.01; 210/393; 210/411; 210/427; 210/439; 210/457
[58] Field of Search ............ 210/107, 234, 235, 323.2, 210/333.1, 333.01, 390, 391, 393, 399, 427, 437, 439, 457, 108, 411

[56] References Cited

U.S. PATENT DOCUMENTS

| | | | |
|---|---|---|---|
| 6,910 | 11/1849 | Johnson | 210/391 |
| 617,133 | 1/1899 | Vance | 210/391 |
| 1,340,599 | 5/1920 | Clarke | 210/391 |
| 1,726,839 | 9/1929 | Kasztory | |
| 1,766,847 | 6/1930 | Tibbetts | |
| 2,365,766 | 12/1944 | Levier | |
| 3,143,139 | 8/1964 | Pretti | |
| 3,421,630 | 1/1969 | Acosta | |
| 3,912,630 | 10/1975 | Reighard et al. | 210/234 |
| 3,994,810 | 11/1976 | Schaeffer | 210/333.1 |
| 4,033,880 | 7/1977 | Bengtsson | 210/424 |
| 4,105,555 | 8/1978 | Pease | 210/426 |
| 4,191,648 | 3/1980 | Kaplan et al. | 210/323.2 |
| 4,442,002 | 4/1984 | Morris | 210/427 |
| 4,465,922 | 8/1984 | Kolibas | 219/304 |
| 4,486,304 | 12/1984 | Neuman et al. | 210/333.1 |

Primary Examiner—Richard V. Fisher
Assistant Examiner—Richard D. Jordan
Attorney, Agent, or Firm—Wood, Herron & Evans

[57] ABSTRACT

A filter for hot melt adhesive is carried within a passageway in a manifold and is rotatable therein between a filtering position in which hot melt adhesive is directed to the inner core of the filter at one end thereof, and a backflushing position in which hot melt adhesive is directed onto the outside surface of the filter at the opposite end thereof. In the filtering position, the hot melt adhesive flows from the inner core outwardly through a filter screen into the main passageway for collection and discharge from one end of the manifold. In the backflushing position the adhesive flow is directed from the outside surface of the filter in the reverse direction through the filter screen to dislodge filtered impurities therefrom, and then the impurities are carried out a drain at the opposite end of the manifold.

8 Claims, 5 Drawing Figures

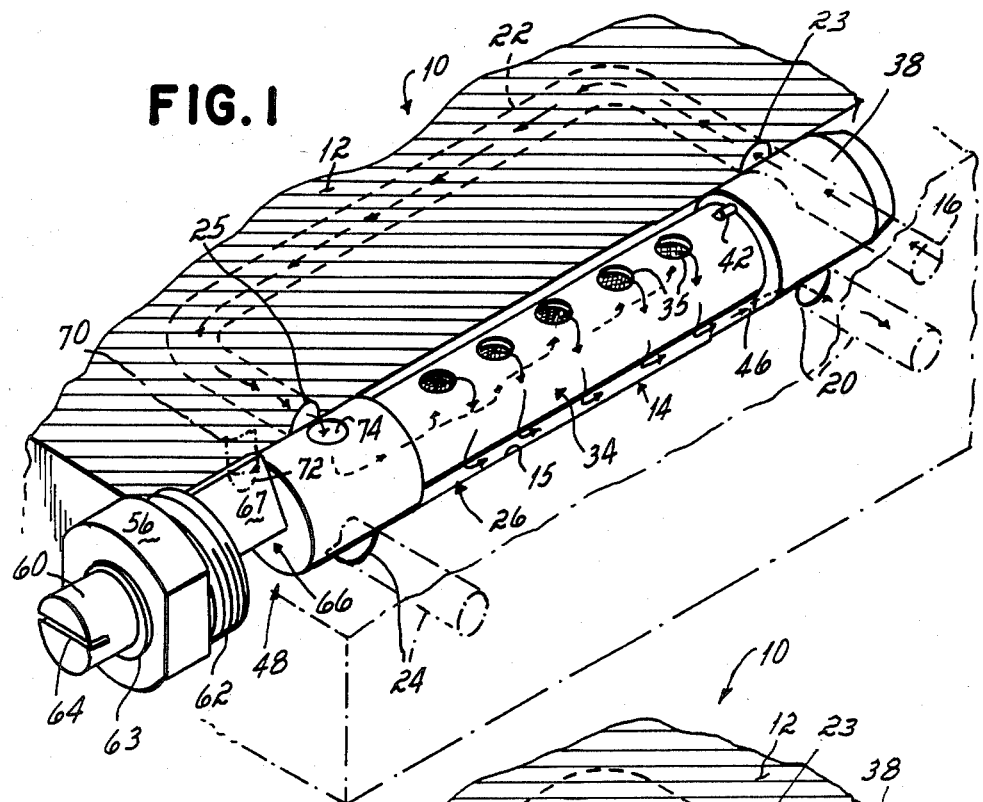

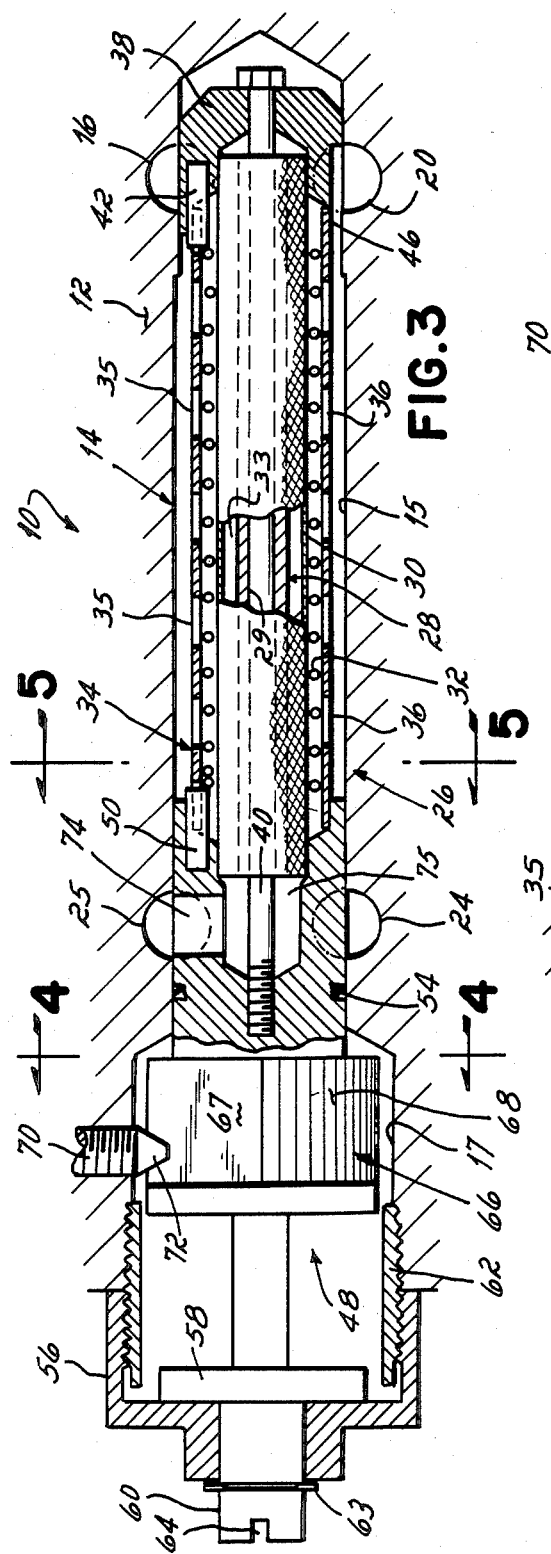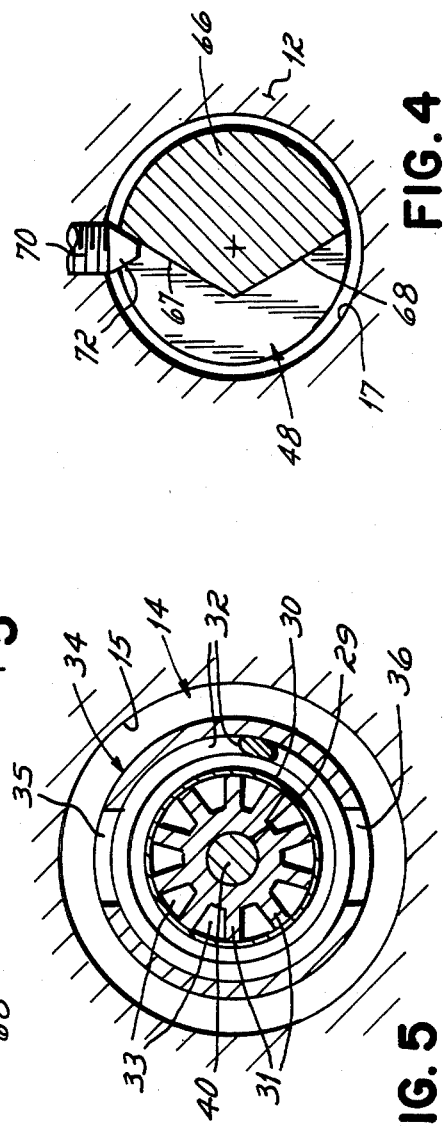

FILTER FOR HOT MELT ADHESIVE

BACKGROUND OF THE INVENTION

This invention relates to filtering devices, and, more particularly, to a filter for removing impurities from hot melt adhesive which is cleaned by reverse flow backflushing.

Several systems have been proposed for the filtering of impurities from fluids, including viscous liquids such as hot melt adhesives. In most systems of this general type, unfiltered liquid is pumped into a filter which is carried within a manifold, vessel or other housing structure. The unfiltered liquid flows either from the outside surface of the filter inwardly to its core, or vice versa, and then the filtered liquid is collected and discharged through an outlet in the housing structure for further use. Eventually the filter begins to clog with collected impurities which must be removed to retain the desired filtering capacity.

In some systems, no provision is made for removing contaminants from the filter while it remains within the housing structure. This requires the system pump to be shut down and the filter removed for cleaning exteriorly of the housing structure or for replacement with a new filter. The downtime associated with removal, cleaning and/or replacement of a filter is particularly disadvantageous in filtering hot melt adhesives or similar materials wherein temperature of the material must be maintained within certain ranges. For example, if hot melt adhesive is allowed to cool as a result of excessive downtime of the filtering system, it becomes extremely viscous and difficult to dispense until the temperature is returned to normal operating levels.

Other filtering systems remove contaminants from the filter by a backflush operation in which contaminants are removed from the filter without removing it from the housing structure. The backflush fluid is often introduced into the filter in the opposite or reverse direction from the direction of flow of the liquid to be filtered, and dislodges contaminants from the filter for removal through a drain. Unfortunately, many filtering systems are characterized by relatively complex valving arrangements and/or other flow control devices to convert from the filtering operation to the backflush operation. In order to clean the filter by backflushing, such filtering systems employ one set of valves to shut off the flow of unfiltered fluid to the filter, and another set of valves or other flow control devices to introduce the backflush fluid into the filter. These systems are not only relatively costly to construct and maintain, but often make access to the filter difficult for replacement or external cleaning.

SUMMARY OF THE INVENTION

It is therefore among the objectives of this invention to provide a filtering system for hot melt adhesive in which the filter is easily removed for external cleaning or replacement, which converts from a filtering operation to a backflushing, cleaning operation quickly and simply without employing valves or similar flow control devices and which is economical to construct and maintain.

These objectives are accomplished in a filter system particularly adapted for hot melt adhesive in which an annular filter is carried within a main passageway formed in a manifold. The filter is rotatable within the main passageway between a filtering position in which hot melt adhesive from an adhesive inlet is directed into the interior of the filter at one end thereof and flows outwardly through the filter to an outlet, and a backflush position in which hot melt adhesive from the same adhesive inlet is directed onto the outside surface of the filter and flows inwardly through the filter and is discharged to a drain. In the filtering operation, the adhesive flows from the inside of the annular filter outwardly into the main passageway where it is collected and transmitted to an outlet formed in the manifold. Backflushing is accomplished by directing unfiltered hot melt adhesive from the outside surface of the filter into its interior to dislodge filtered impurities, and then out a drain formed in the manifold.

In the preferred embodiment of this invention, the filter comprises an elongated, generally annular core having a throughbore and a splined outer surface formed with a plurality of spaced, radially outwardly extending splines defining channels therebetween. The inner core supports a wire mesh or screen which mounts to the spaced splines. A spacer, preferably in the form of a coil spring, is wrapped about the screen and is received within a hollow, outer sleeve having a plurality of spaced apertures. The filter is received within the main passageway of the manifold, and retained therein by a threaded cap connected to outer end of the filter which permits easy removal of the filter from the manifold for additional cleaning or replacement. The outside surface of the annular filter is concentric with the inner wall of the main passageway and is spaced therefrom to permit rotation of the filter within the main passageway.

The manifold is ported to provide for the delivery of unfiltered hot melt adhesive to the filter, the removal of filtered adhesive therefrom and the discharge of filtered impurities to a drain. An adhesive inlet formed in the manifold interconnects a first end of the main passageway and a delivery line from an adhesive pump. A filtered adhesive outlet is formed in the manifold. This outlet is connected to the first end of the main passageway and at a point spaced from the adhesive inlet. In the presently preferred embodiment, an internal conduit is formed in the manifold. This conduit is connected at one end to the adhesive inlet and at the other end to the opposite, second end of the main passageway. A drain is formed in the manifold and is connected to the second end of the main passageway at a point spaced from the end of the internal conduit.

The flow of adhesive within the manifold to the passageways and outlets described above is controlled by rotating means in the form of flow control elements mounted at opposite ends of the filter. At the first end or adhesive inlet end of the main passageway, a cap is mounted to the outer sleeve of the filter. The cap is formed with a slot which terminates at the outside surface of the outer sleeve. A filter bung is mounted to the opposite or second end of the filter. One end of the filter bung extends outwardly from the manifold and is formed with a screw slot or other means to effect rotation of the filter and filter cap within the main passageway. The opposite, inner end of the filter bung is formed with a bore which communicates with the core of the filter.

The operation of the filtering system herein is as follows. In order to filter the hot melt adhesive, the filter is rotated to a filtering position wherein the rotating means or elements are positioned such that the bore in the filter bung communicates with the internal conduit formed in the manifold, and the slot in the cap is positioned in alignment with the filtered adhesive outlet and spaced from the adhesive inlet. The flow of adhesive is therefore directed through the adhesive inlet, over the cap and into the conduit formed in the manifold which transmits the adhesive to the second end of the main passageway. At the second end, the hot melt adhesive flows into the bore formed in the filter bung and then into the channels formed between the splines on the outside of the inner core of the filter. Impurities are removed from the hot melt adhesive as it flows outwardly through the wire screen toward the outer sleeve. The now-filtered adhesive enters the main passageway through the apertures in the outer sleeve and flows into the filtered adhesive line through the slot in the cap at the first end of the filter.

The backflushing operation is performed by directing the adhesive flow in the opposite direction along the filter and from the exterior surface of the filter to its inner core. In order to begin the backflush operation, the adhesive pump is shut down to reduce the internal manifold pressure, and the filter is then rotated approximately 180°. Stops are provided within the manifold to ensure that the filter does not rotate more than 180°. This rotation of the filter places the slot in the cap into communication with the adhesive inlet, and the bore of the filter bung in communication with the drain at the second end of the filter. The pump is then activated and adhesive is directed through the adhesive inlet, into the elongated slot of the cap and then onto the outside surface of the outer sleeve. The adhesive flows through the apertures in the outer sleeve inwardly to the inner core which dislodges collected impurities from the wire screen. The adhesive flows through the spaces or channels between the splines of the inner core to the second end of the filter and into the bore of the filter bung, which then transmits the collected impurities and backflushing adhesive into the drain for removal from the manifold.

DESCRIPTION OF THE DRAWINGS

The structure, operation and advantages of the preferred embodiment of this invention will become further apparent upon consideration of the following description taken in conjunction with the accompanying drawings, wherein:

FIG. 1 is an isometric view in partial cross section of the filtering system of this invention with the filter in a filtering position;

FIG. 2 illustrates the system of FIG. 1 with the filter in a backflush position;

FIG. 3 is an enlarged cross sectional view showing the details of the filter construction and arrangement within the manifold;

FIG. 4 is a cross sectional view taken generally along line 4—4 of FIG. 3 illustrating the stops for limiting rotation of the filter within the manifold; and FIG. 5 is a cross sectional view taken along line 5—5 of FIG. 3.

DETAILED DESCRIPTION OF THE INVENTION

Referring now to the drawings, the filtering system 10 of this invention includes a manifold 12 formed with a main passageway 14 having an elongated inner portion 15 extending into the manifold 12, and a larger diameter counterbore portion 17 terminating at the outside surface of the manifold 12. An adhesive inlet 16 is formed in the manifold 12 which intersects one end of the inner portion 15 of main passageway 14. A delivery line from a hot melt adhesive pump (not shown) is connected to the adhesive inlet 16 to provide a flow of unfiltered, hot melt adhesive into the manifold 12 as discussed in detail below. A filtered adhesive outlet 20 is also formed in the manifold 12. The adhesive inlet 16 and filtered adhesive outlet 20 are vertically spaced from one another and positioned with respect to the main passageway 14 so that the lower half of the adhesive inlet 16 intersects the main passageway 14 and the upper half of filtered adhesive outlet 20 intersects the main passageway 14. See FIG. 3.

An internal conduit 22 is formed in the manifold 12 having an inlet 23 connected to the adhesive inlet 16 at the main passageway 14, and an outlet 25 at the opposite end of the inner portion 15 of main passageway 14. A drain 24 is formed in the manifold 12 which is vertically spaced from the outlet 25 of conduit 22. As shown on the lefthand side of FIG. 3, the outlet 25 of conduit 22 and inner end of drain 24 are positioned with respect to the main passageway 14 so that the bottom half of the outlet 25 of conduit 22 intersects main passageway 14 and the top half of the inner end of drain 24 intersects main passageway 14.

A filter assembly 26 is rotatably received within the main passageway 14 of manifold 12 for filtering the hot melt adhesive supplied through adhesive inlet 16 and producing filtered adhesive for discharge through the filtered adhesive outlet 20. The filter assembly 26 comprises an annular inner core 28, formed of a lightweight material such as aluminum. The inner core is formed with a throughbore 29 and a plurality of spaced, radially outwardly extending splines 31. The spaces between the splines 31 form channels 33 for the passage of melted hot melt adhesive, as discussed below. The inner core 28 is encased by a metal filter screen 30 which mounts to the splines 31 and provides for filtering of the hot melt adhesive as described below. A spacer 32, preferably in the form of a helical wire spring, is wrapped about the outside surface of screen 30. An outer sleeve 34 is then mounted over the spacer 32. The outer sleeve 34 is formed with five spaced apertures 35 on one side and five spaced apertures 36 on its opposite side, spaced approximately 180° from the apertures 35. The outside surface of outer sleeve 34 is concentric with the inner wall 15 of main passageway 14 with a sufficient clearance therebetween to permit rotation of the filter assembly 26 within the main passageway 14.

Referring now to the righthand side of the filter assembly 26 as best shown in FIGS. 1-3, a cap 38 is mounted to one end of the outer sleeve 34 by a lag screw 40 which extends through the throughbore 29 in the inner core 28 to the opposite end of the filter assembly 26. The cap 38 is maintained in a fixed radial position relative to the outer sleeve 34 by a pin 42 which is mounted on the outer sleeve 34 and received within a keyway formed in the cap 38. As best shown in FIG. 2, the cap 38 is formed with a slot 46 which extends radially inwardly from the outer surface of cap 38 to the outside surface of outer sleeve 34. As described in detail below, the slot 46 communicates with either the adhesive inlet 16 or the filtered adhesive outlet 20 depending upon the position of filter assembly 26.

The structure mounted to the opposite end of filter assembly 26 is illustrated on the lefthand portion of FIG. 3. A filter bung 48 is received within the larger diameter, counterbore portion 17 and extends partially into the inner portion 15 of main passageway 14 where it is connected to the end of inner core 28 of filter assembly 26 by the lag screw 40. The filter bung 48 is maintained in a fixed radial position with respect to the filter assembly 26 by a pin 50 which is mounted to the outer sleeve 34 and received within a keyway formed in the filter bung 48. An O-ring 54 forms a seal between the filter bung 48, and the inner wall 15 of main passageway 14.

The filter assembly 26 is retained within the main passageway 14 by a nut 56 mounted to the end portion of filter bung 48 which comprises a head portion 58 and a stem portion 60 extending outwardly from the manifold 12. The nut 56 fits over the stem portion 60 and is threaded onto a straight thread nipple 62, fixedly mounted within the counterbore portion 17 of main passageway 14 in manifold 12, until the nut 56 seats against the head portion 58 of filter bung 48 and the outside edge of manifold 12. A retaining ring 63 is mounted to the stem portion 60 of filter bung 48 to maintain the nut 56 in assembled relation with straight thread nipple 62. The nut 56 therefore makes it easy to install or remove the filter assembly 26 from the manifold 12. In the preferred embodiment, the stem portion 60 is formed with a screw slot 64 for rotation of the filter bung 48, and, in turn, the filter assembly 26, as discussed below.

The filter bung 48 is formed with a body portion 66 at the inward end of the counterbore portion 17 of main passageway 14 having a generally triangular-shaped cross section defining opposed bearing surfaces 67, 68 spaced approximately 180° apart. See FIG. 4. A screw 70 is inserted through the manifold 12 into the main passageway 14 and is positioned with respect to the filter bung 48 such that the tip 72 of the screw 70 engages the bearing surface 67 upon rotation of the filter bung 48 in one direction, and engages the bearing surface 68 on the opposite side of filter bung 48 upon rotation thereof in the opposite direction. As discussed below, the bearing surfaces 67, 68 are spaced from one another so as to permit approximately 180° rotation of the filter bung 48, and, in turn, the filter assembly 26, before rotation is prevented by engagement with the screw tip 72.

The inwardmost portion of filter bung 48 extends into the inner portion 15 of main passageway 14 where it is keyed to the filter assembly 26 as described above. The inwardmost portion of filter bung 48 is formed with a radial flow passage 74 interconnecting the outer surface of filter bung 48 and a flow passage 74 formed in the interior of the filter bung 48 in communication with the inner core 28 of filter assembly 26. As illustrated in FIGS. 1 and 2, the end of passage 74 at the outside surface of filter bung 48 is positioned with respect to the outlet 25 of conduit 22, and the drain 24, so as to align with one or the other depending upon the position of filter assembly 26, as described below.

Referring now to FIGS. 1 and 2, the operation of the filter system 10 of this invention is illustrated. Considering first FIG. 1, the filtering system 10 is shown in a filtering position wherein unfiltered hot melt adhesive pumped into the manifold 12 through a delivery line is filtered within the filter assembly 26, and then the filtered adhesive is discharged through the filtered adhesive outlet 20.

Assuming that the filter had just been backflushed, the adhesive pump connected to the adhesive inlet 16 is shut down to reduce pressure within the manifold 12, and a screwdriver is inserted within the screw slot 64 in filter bung 48 to rotate the filter assembly 26 to a filtering position in which the bearing surface 67 of filter bung 48 engages the screw tip 72. In the filtering position, the slot 46 in cap 38 is placed into communication with the filtered adhesive outlet 20, and the flow passage 74 formed in the filter bung 48 is positioned in fluid communication with the outlet 25 of conduit 22 formed in the manifold 12. Additionally, the apertures 35 of outer sleeve 34 are placed at the top of the filter assembly 26 as it is illustrated in FIG. 1.

The pump is then activated and unfiltered hot melt adhesive flows into the manifold 12 through the adhesive inlet 16. With the slot 46 in cap 38 positioned beneath the adhesive inlet 16 and in communication with the filtered adhesive outlet 20, the adhesive flows over the cap 38 directly into the inlet 23 of conduit 22 in the manifold 12. The conduit 22 transmits the adhesive to the opposite end of filter assembly 26 where it flows through the outlet 25 of conduit 22 into the flow passage 74. The adhesive enters the bore 75 within filter bung 48 from the flow passage 74 and then flows through the channels 33 between the spaced splines 31 of the inner core 28 of filter assembly 26. The adhesive flows along the length of inner core 28 and outwardly through the screen 30. During the course of passage through the screen 30, impurities are removed from the unfiltered adhesive so that filtered adhesive flows from the screen 30 through the apertures 35, 36 in outer sleeve 34 where it is collected within the main passageway 14. The filtered adhesive then flows from main passageway 14 through the slot 46 in cap 38 into the filtered adhesive outlet 20 for discharge from the manifold 12.

Referring now to FIG. 2, the filter assembly 26 is illustrated in a backflush position. In order to backflush the filter assembly 26 for cleaning, the pump is first shut down to avoid a pressure surge of backflush adhesive through the drain passage 24, and a screwdriver is inserted within screw slot 64. The filter bung 48 and filter assembly 26 are then rotated approximately 180° until the bearing surface 68 on the opposite side of filter bung 48 engages the screw tip 72. The filter bung 48, filter assembly 26 and cap 38 rotate as a unit because they are keyed together by pins 42, 50 as described above.

As illustrated in FIG. 2, the slot 46 of filter cap 38 moves from the filtered adhesive outlet 20 into alignment with the adhesive inlet 16 with the filter assembly 26 in the backflush position. At the opposite end of filter assembly 26, the flow passage 74 of filter bung 48 rotates out of alignment with the outlet 25 of internal passageway 22 and into communication with the drain passageway 24.

The pump is then activated to direct unfiltered hot melt adhesive through the adhesive inlet 16 into the manifold 12. The adhesive flows from the adhesive inlet 16 into the slot 46 in cap 38 which directs the adhesive onto the outside surface of the outer sleeve 34. The adhesive flows along the outside surface of outer sleeve 34 until it reaches an aperture 36 at which time it flows inwardly through the screen 30 and into the channels 33 on the outside of inner core 28. This reverse flow of adhesive, i.e., from the outside of the filter assembly 26 to the inside, dislodges a substantial amount of the impurities which had been collected on the screen 30 during the filtering operation. These impurities and the backflushing adhesive are carried through the channels 33 of the inner core 28 into bore 75 of filter bung 48. The impurities and backflush adhesive exit the bore 75 through flow passage 74 which directs such material into the drain 24 for discharge from the manifold 12 to waste.

While the invention has been described with reference to a preferred embodiment, it will be understood by those skilled in the art that various changes may be made and equivalents may be substituted for the elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. Apparatus for filtering hot melt adhesive, comprising:

annular filter means having an outer filtering portion, an inner flow channel, a first end formed with a first flow passageway communicating with said outer filtering portion and a second end formed with a second flow passageway inlet communicating with said inner flow channel;

a manifold formed with a main passageway and a conduit, said manifold having an adhesive inlet, a filtered adhesive outlet and a drain each connected to said main passageway, said annular filter means being rotatably carried within said main passageway of said manifold with said first end being positioned at said adhesive inlet, said second end being positioned at said drain and said conduit extending between said first and second ends;

rotatable means carried by said annular filter means for rotating said annular filter means between a filtering position and a backflushing position, said rotatable means in a first position being effective to interconnect said adhesive inlet with said conduit to direct hot melt adhesive therethrough and into said second flow passageway at said second end of said annular filter means, the hot melt adhesive flowing through said second flow passageway into said inner channel of said annular filter means and then through said outer filtering portion thereof for filtering impurities from the hot melt adhesive, the filtered hot melt adhesive flowing along said main passageway into said filtered adhesive outlet for discharge from said manifold;

said rotatable means when in a second position being effective to interconnect said adhesive inlet to said first flow passageway at said first end of said annular filter means for directing hot melt adhesive through said first flow passageway to said outer filtering portion of said annular filter means, the hot melt adhesive flowing inwardly from said outer filtering portion into said inner flow channel of said annular filter means for dislodging filtered impurities from said outer filtering portion and transmitting the impurities into said drain for discharge from said manifold.

2. The apparatus of claim 1 in which said annular filter means comprises:

an elongated, generally annular inner core formed with a throughbore and an outer surface having a plurality of spaced splines defining channels therebetween;

a screen mounted to said spaced splines of said inner core;

a spacer mounted to the outside surface of said screen; and an outer sleeve mounted to the outside surface of said spacer, said outer sleeve being formed with a plurality of spaced apertures communicating with said main passageway.

3. The apparatus of claim 2 in which said spacer is an elongated spring mounted to said outside surface of said screen.

4. The apparatus of claim 1 in which said annular filter means includes:

a cap mounted to said first end of said annular filter means, said cap being formed with a slot extending radially inwardly to the outer surface of said annular filter means, said slot defining said backflushing fluid inlet; and a filter bung mounted to said second end of said annular filter means, said filter bung being formed with a bore communicating with said inner flow channels of said annular filter means, said slot defining said filtering fluid inlet.

5. Apparatus for filtering hot melt adhesive, comprising:

a manifold formed with a main passageway, said manifold having an adhesive inlet, a filtered adhesive outlet and a drain each connected to said main passageway;

annular filter means including an inner core having spaced, radially outwardly extending splines forming channels therebetween, a screen mounted to said spaced splines, a spacer mounted to the outer surface of said screen and an outer sleeve mounted to the outer surface of said spacer, said filter means being carried within said main passageway and rotatable therein between a filtering position and a backflushing position;

a cap mounted to one end of said filter means, said cap being formed with a slot extending between the outside surface of said cap and said outer sleeve of said filter means;

a filter bung mounted to the opposite end of said filter means, said filter bung being formed with a passage communicating with said channels of said inner core of said annular filter means;

said annular filter means being rotatable within said main passageway to said filtering position wherein said passage in said filter bung communicates with said adhesive inlet and said slot in said cap communicates with said filtered adhesive outlet, the hot melt adhesive being directed from said adhesive inlet, through said passage and into said channels between said spaced splines of said inner core of said annular filter means, the hot melt adhesive thereafter flowing radially outwardly from said channels through said screen of said filter means for filtering, the filtered hot melt adhesive then flowing into said main passageway for delivery through said slot in said cap to said filtered adhesive outlet;

said filter means being rotatable from said filtering position to said backflushing position wherein said slot in said cap communicates with said adhesive inlet and said passage in said filter bung communicates with said drain, the hot melt adhesive being directed from said adhesive inlet, into said slot in said cap to said screen of said annular filter means, the hot melt adhesive flowing inwardly through said screen to said channels of said inner core of said filter means and then through said passage in said filter bung out said drain.

6. The apparatus of claim 5 in which said manifold is formed with an internal conduit extending between said cap and said filter bung, said internal conduit transmitting adhesive from said adhesive inlet to said passage in said filter bung with said filter means in said filtering position.

7. The apparatus of claim 5 in which said filter bung is formed with an extension located exteriorly of said manifold, said extension being formed with means for permitting rotation of said filter bung, and in turn said annular filter means, within said main passageway.

8. The apparatus of claim 5 further including stop means for limiting rotation of said filter means between said filtering position and said backflushing position, said stop means comprising a screw extending into said main passageway and a pair of spaced stops formed on said filter bung and engageable with said screw.

* * * * *